(No Model.)
W. H. TUFTS.
FISHING LINE FLOAT.
No. 332,573. Patented Dec. 15, 1885.
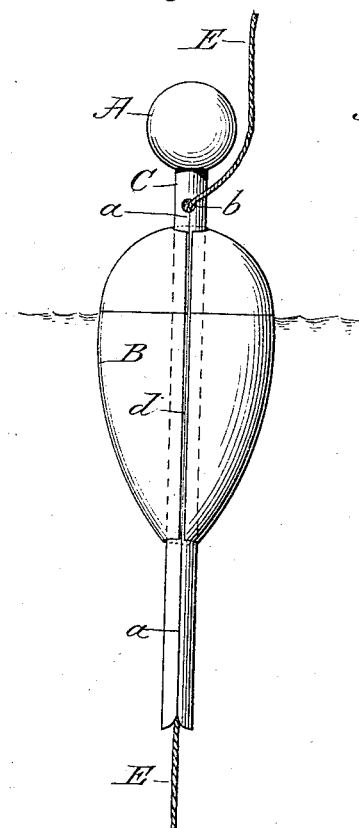
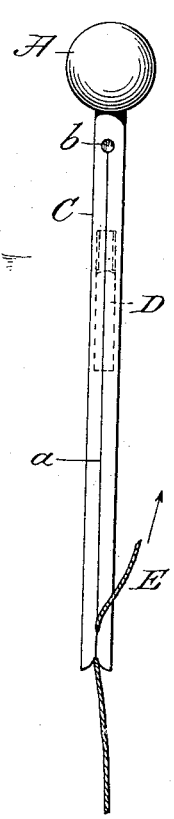
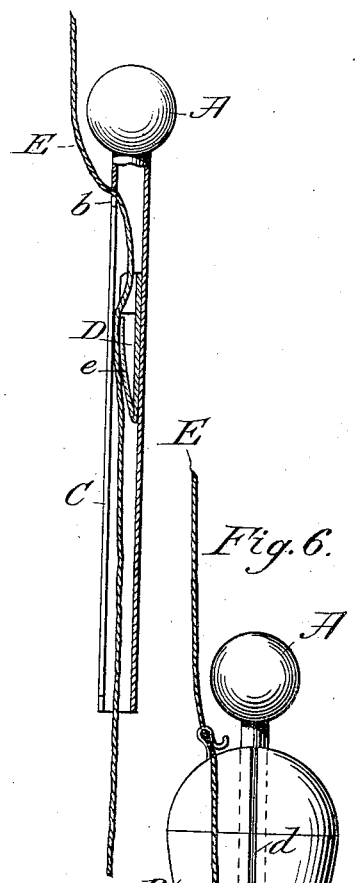
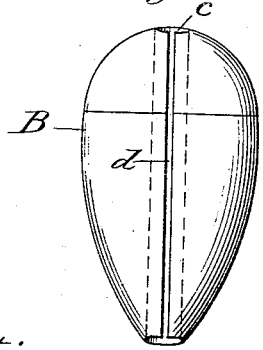
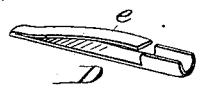
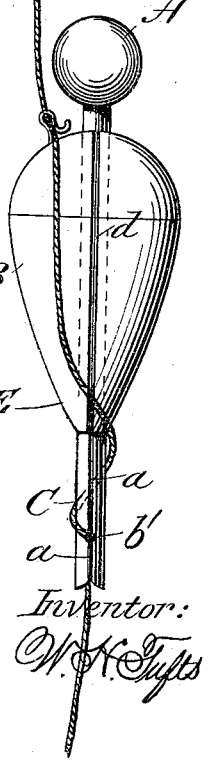
Attest:
F. H. Schott
A. W. Bingham
Inventor:
W. H. Tufts

UNITED STATES PATENT OFFICE.

WILLIAM H. TUFTS, OF WASHINGTON, DISTRICT OF COLUMBIA.

FISHING-LINE FLOAT.

SPECIFICATION forming part of Letters Patent No. 332,573, dated December 15, 1885.

Application filed February 7, 1885. Serial No. 155,196. (No model.)

*To all whom it may concern:*

Be it known that I, WILLIAM H. TUFTS, a citizen of the United States, residing in Washington, District of Columbia, have invented a new and useful Float for Fishing-Lines, of which the following is a specification.

The object of my invention is to produce a float so simple and practical in its construction that it can be quickly attached to or taken from the line and securely fastened thereto or moved thereon either by sliding or reeling.

This device consists of a body made of wood, cork, rubber, celluloid, or any suitable material, through which is a longitudinal bore. Connecting with this bore is a longitudinal slit cut from the outside and running coextensive with it, $d$, Fig. 4. Into the bore in the float-body is placed a permanent tube, and into said tube a spring, both constructed and used in the manner hereinafter described.

The drawings submitted herewith illustrate the construction of parts and show the relation of the same to each other when united.

Similar letters refer to like parts therein.

Figure 1 is a view showing the float as it appears with its various parts united and on the line ready for use; Fig. 2, a sectional view showing the ball A, surmounting the tube C, the slit $a$, and the aperture $b$ in the tube, with the line E as it appears after it has been pressed into the slit $a$ in the tube preliminary to its upward passage; Fig. 3, a sectional view showing the ball A, the tube C, the slit $a$, the aperture (or outlet-hole) $b$, the spring D in position, and the line E after it has passed up the slit and over the arm $e$ of the spring to and out of the aperture $b$; Fig. 4, a view of the float-body B, provided with the bore $c$ and the slit $d$; Fig. 5, a perspective view of the spring D with its elastic arm $e$; Fig. 6, a view of the float, showing the method of attaching to the line when the aperture $b$ is placed at the lower end of the slitted tube $b'$, and the manner of securing it at the top by means of a wire "eye" or loop.

The tube C has a very fine slit cut into it, running from one end to an outlet-hole, $b$, said outlet-hole being placed at any desired distance from the end of the tube, in order that the line may emerge from it at any desired point. Surmounting the tube is a ball, A, placed there to aid the sight while trying to locate the float on the water. It also renders it more unique. The tube C is to be permanently fastened into the bore $c$ in the float-body B, and the slit $a$ must be placed opposite the slit $d$ in said float-body. By this arrangement the line E, when pressed into the slit $a$ in the tube C, Fig. 2, can pass up through both slits $a$ and $d$ until it is free at the outlet-hole $b$, as shown in Fig. 1. The material of which the tube is made must be elastic enough to open when the line is pushed into the slit $a$, and close up as the line passes along on its way to the outlet-hole $b$, vulcanized rubber or celluloid answering the purpose admirably.

A very important feature in the construction of this float is the spring D, placed in the tube C to regulate the movement of the float on the line. This spring is made with a convex elastic arm, $e$, which, when placed in the tube, is always pressing firmly against the top or roof of the tube in a line with the slit $a$. Over this rounded or convex arm $e$ the line passes on its way up the slit $a$ in the tube C. (See Fig. 3.) By the friction thus created the float is held in its place, or easily and speedily moved to any desired place on the line, and a way provided by which the line E can be reeled through the float after the latter has stopped at the end of the rod. It also permits the use of coarse or fine lines with the same float, the elastic arm $e$ acting as a regulating tension therefor.

To attach the float to the line, press the latter into the slit $d$ at the bottom of the tube C, Fig. 2, and pull upward until the line emerges from the outlet-hole $b$, as in Fig. 1.

To detach the float, pull the line out of the slit $d$ at the bottom of the tube C, and pull upward until the line is released.

The float can be secured to the line without the aid of the tension-spring by allowing the tube to be movable; for if, after the line has emerged from the outlet-hole $b$, the tube is turned around and crowded down the line will be forced between the tube and float-body, thus creating sufficient friction to hold the float firmly to the line.

A very practical and simple method for attaching this float is to place the aperture $b$ in the tube near the lower end, allowing the line to escape from the tube at that point, $b'$, Fig.

6, securing it at the top by a wire loop or other suitable device. An excellent tension is created by passing the line around the tube, as represented in Fig. 6.

Floats taking a horizontal position on the water should have a tube in each end, constructed with the slit and aperture—i. e., duplicates of that part of the tube shown at $a$ $b'$, Fig. 6. To attach the latter float, draw the line through the slit $a$ to the aperture $b'$, where it will escape from the tube. To secure it at the opposite end, repeat the operation as at first. The line will then rest in the tube at either end. The necessary tension may be had by winding the line around the float before securing it at the final end.

I am aware that sinkers have been made having the same object in view that I have in my float—viz., that of fastening or unfastening at any point on the line without cutting it; but none I have seen would furnish a suggestion even of the manner in which I accomplish this result with my float device. In some sinkers the aperture and slit are not longitudinally alike, the latter making several turns in different directions before opening at either end. In others a slit is made into a bar of lead, and portions of said bar are cut off to suit. These are put upon a line and the slit hammered or pinched until it closes upon it.

A float has been patented, No. 250,848, December 13, 1881, made with a bore into which is placed a device for "gripping" or holding the line, but, unlike mine, it has no slit connecting with said bore, and to put the float on the line one end of the latter must be free from the rod or hook, that it may be inserted into and pushed through said device and bore from end to end of the float.

My float, having a slit connecting with the bore, permits the line to be run into the tube through the slit, and thus be put on or taken off the line at any point, with the ends of the line secured to both hook and rod.

My invention, it is evident, is entirely dissimilar in construction and operation to any of the within-noted methods, and, so far as I am aware, to any other.

What I claim as a new article of manufacture and use, and for which I ask Letters Patent, is—

1. A float-body, B, having a longitudinal bore, $c$, through it, and a slit, $d$, coextensive with the bore, in combination with the slitted tube C, provided with the aperture $b$ for releasing the line, substantially as set forth herein.

2. A float-body, B, having a longitudinal bore through it and a connecting-slit of same length, in combination with the tube C, provided with the slit $a$, the aperture $b$, and the spring D, for clamping the line, all as specifically described herein.

3. A float-body, B, having a longitudinal bore and connecting-slit $d$, in combination with a slitted tube provided with the aperture $b$, the spring D, and the ball A, substantially as specified.

4. A float having at one end a line attaching device consisting of a slitted tube with an aperture, and suitable means for securing the line at the other end, substantially as described herein.

WM. H. TUFTS.

Witnesses:
  A. W. BINGHAM,
  WAYNE W. CORDELL.